UNITED STATES PATENT OFFICE.

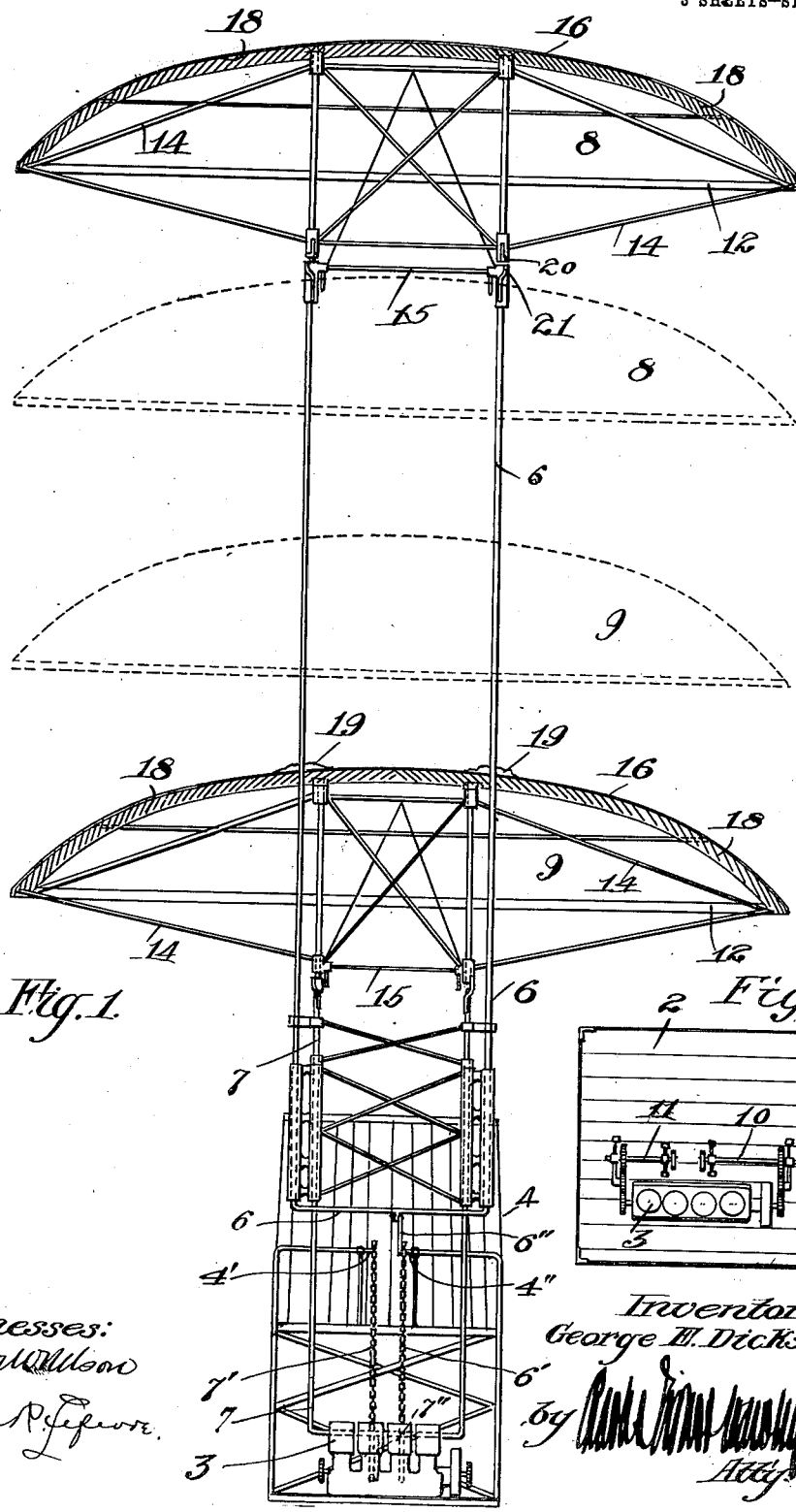

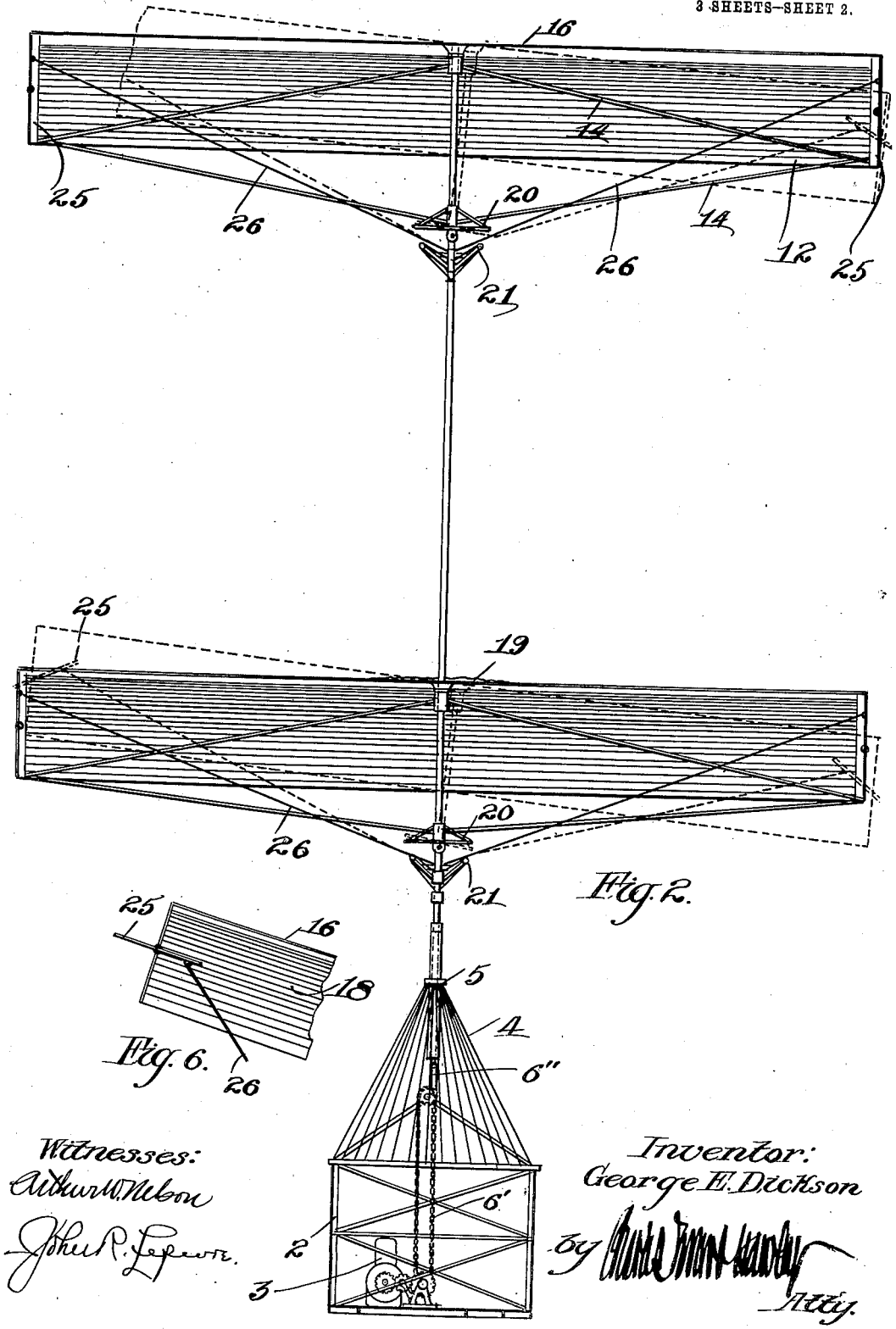

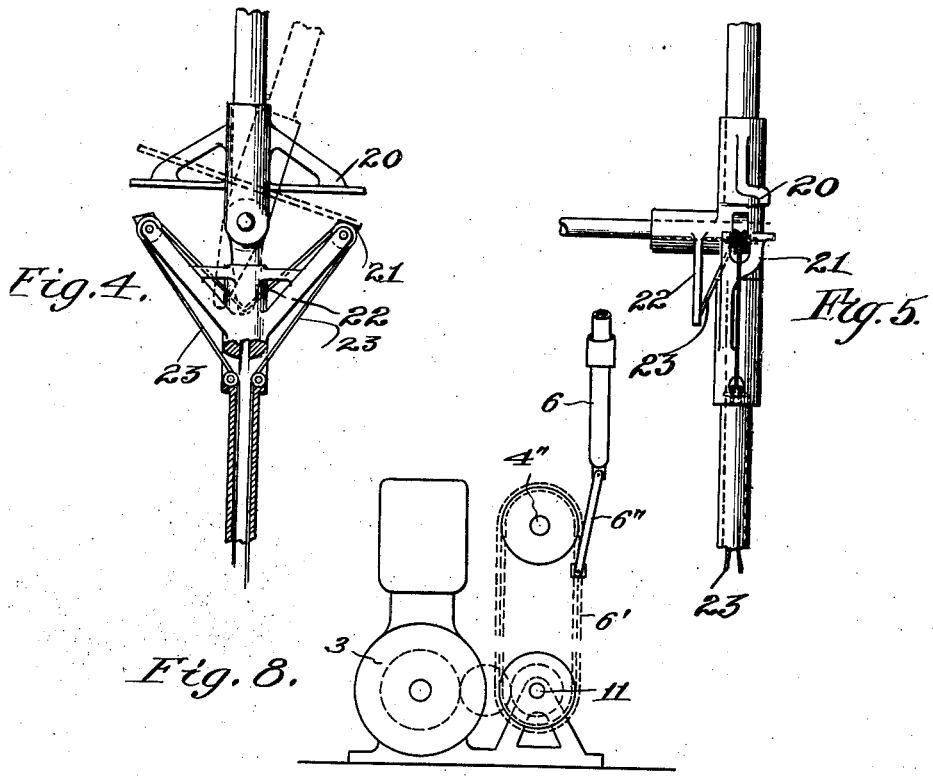
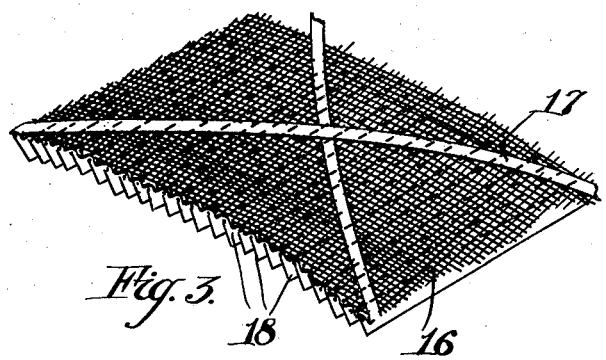

GEORGE E. DICKSON, OF NEW LENOX, ILLINOIS.

FLYING-MACHINE.

1,073,334.

Specification of Letters Patent.  Patented Sept. 16, 1913.

Application filed December 11, 1908. Serial No. 467,049.

*To all whom it may concern:*

Be it known that I, GEORGE E. DICKSON, a citizen of the United States, and a resident of New Lenox, in the county of Will and State of Illinois, have invented certain new and useful Improvements in Flying-Machines, of which the following is a full, true, clear, and exact specification.

This invention relates to that class of flying machines in which the principle of the parachute is utilized in conjunction with the principles of the aeroplane, and the object of my invention is to so utilize such principle that the rapid fall of an object shall not alone be prevented, but the lifting of said object and forward movement shall be accomplished.

Another principle that I desire and expect to utilize is that which is evidenced in a bird's wing, wherein the feathers overlap one upon the other, closing together upon the downward stroke of the wing and opening to permit the passage of air through the wing on its upward stroke.

My invention consists in a flying machine which comprises a body part or car containing a motor, in combination with two or more combined parachutes and planes arranged above the body upon suitable stems or frames that are arranged for reciprocation by said motor. Each parachute member is composed of a suitable frame having a covering that is valvular, that is, made up of a large number of feather-like or flap parts, that are adapted to fall or open on the upward stroke of the parachute and are adapted to close one upon the other on the downward stroke of the parachute, whereby, as the parachute is elevated with relation to said body, air will, so-to-speak, be taken into or beneath the parachute, with a minimum of resistance to its motion, and, as the parachute is moved downwardly, will be compressed beneath the parachute, thereby tending to elevate the body. The parachutes operate in opposite directions, that is, as one is elevated, the other is drawn down, with the result that one or the other exerts its force upon the air at all times, to sustain the suspended body.

My invention also consists in a flying machine of the foregoing description, so constructed and equipped that its parachutes may be adjusted at desired inclinations with respect to the line of perpendicular suspension of the body, to cause the movement of the machine as a whole in a forward direction, or to interrupt such forward movement, the parachutes then operating as aeroplanes.

My invention also consists in novel constructions which I have worked out for carrying my invention into effect, all of which will be readily understood by reference to the accompanying drawings, forming a part of this specification, and in which:—

Figure 1, is an end elevation of a flying machine embodying my invention; Fig. 2, is a longitudinal and vertical elevation of the same, showing the parachutes broken away, or sectioned to disclose the arrangement of the internal parts in the same; Fig. 3, is an enlarged detail section of the top of one of the parachutes, illustrating the construction thereof and the arrangement of the flaps or valves; Fig. 4, is an enlarged detail of the device for adjusting the inclination of a parachute and for maintaining such an inclination at will; Fig. 5, is an end elevation of the parts shown in Fig. 4; and Fig. 6, is a detail of one of the end valves or gates. Fig. 7 is a plan view of the car body showing the location of the engine and connecting parts. Fig. 8 is an enlarged view in detail of the mechanism for operating the parachutes.

In said drawings, 2, represents the body of the machine above referred to. This body is made as light as possible, and carries the motor, 3, employed for propelling or reciprocating the parachutes. The body, 2, has an upward extension, 4, equipped with a guide, 5, at its upper end, which guide carries the reciprocating stems or frames, 6 and 7, that hang from the parachutes, 8 and 9, respectively. The motor, 3, (preferably a gasolene engine) drives two slow-motion jack shafts, 10 and 11, which in turn drive two vertically disposed chain belts, 6' and 7', the upper sprocket wheels of which are held by shafts 4' and 4'', in the upper part of the extension, 4. The belts, 6' and 7', are connected to respective frames, 6 and 7, by means of the connecting rods, 6'' and 7''', respectively and the frames 6 and 7 being secured to the chains 6' and 7' by means of the connecting rods 6'' and 7'' are reciprocated by the travel of the chains 6' and 7'. It will be noticed by reference to Fig. 1 that the connecting links 6'' and 7'' are at opposite limits of the travel of the chains. Thus the frames 6 and 7 will be reciprocated in opposite directions.

It will be observed that the body is suspended from the parachutes through the medium of the jack shafts of the motor, and therefore the lifting tendency of the parachutes effects the elevation or stepping upward and forward of the whole structure.

The parachutes may, if desired, be of circular construction, but I much prefer to employ elongated or oblong parachutes, substantially twice as long as they are wide. The upper parachute may be made larger than the lower one, to compensate for the "blanketing" effect of the lower parachute where the parachutes are closed together. Said parachutes are of peculiar construction in that each comprises a light, preferably metallic frame, 12, that is stayed by a large number of tie-rods, 14, that extend to a cross-frame or brace, 15. Furthermore, these parachute frames are pivoted on the upper ends of respective frames, 6 and 7, in order that the parachutes may be inclined with relation to the normally perpendicular positions of said frames, 6 and 7.

The top of each parachute is preferably composed of light wire-cloth, 16, of comparatively coarse mesh, and tied or braced across the top by a plurality of tapes or bands, 17. To the under side of this wire-cloth top I attach a very large number of flexible flaps or feathers, 18. These may be of cloth and may be sewed or stitched directly to the wire-cloth, 16. I preferably arrange the flaps longitudinally, but it is obvious that they may occupy any other or divers positions within the top of the parachute.

In order that the lower parachute, 9, may be tilted with respect to the frame, 7, of the upper parachute, I preferably provide said lower parachute with flexible cloth closures, 19, that fit in around the sides of the frame, 6, at its upper end.

As before stated, the parachutes are pivoted on their respective frames, 6 and 7, and I preferably provide each parachute frame with stops, 20, to engage the corresponding stops, 21, on the reciprocating frame and prevent excessive inclination of the parachutes.

For inclining, tilting or dipping the parachutes at will, I provide the parachute frame with a downwardly-extending lever end, 22, and attached to it the cords, 23, on the opposite sides, passing the cords down through the tubular frame to a point where they may be operated by the person in the car.

It will be observed that the pivotal centers of the parachutes are considerably below the planes of the parachute frames. My object in thus placing the pivots is to make the parachutes self-centering or balancing, in case of accident to the cords, 23. In other words, if the cords are freed, either intentionally or by breakage, the parachute connected therewith will instantly assume a perpendicular position with respect to its reciprocating frame, 6, thus affording safety, as the machine even if disabled would fall slowly, operating like an ordinary parachute.

The parachutes possess the form of an inverted trough, and for closing the ends thereof I preferably use the gates, 25. These gates are pivoted within the parachute frames, and are arranged for automatic operation; to close and open when the parachutes are inclined or tilted. The means used to attain this end are simple cords, 26, that extend from the gates to a point on the reciprocating frames below the respective parachute pivots, whereby the inclination of the parachute causes the gates to open, as shown by dotted lines in Fig. 2 and in full lines in Fig. 6. When the gates assume this position, it is obvious that the air may pass through the parachutes, and said parachutes will operate as do the wings of a bird, and also in a manner similar to the action of an aeroplane.

From an analysis of the forces and the arrangement of parts, and from comparison with what is known of the operation of a bird's wing during flight, I conclude that the operation of my flying machine will be substantially as follows:—When the machine rests upon the ground and the motor is started, the parachutes will be set into motion, and will be reciprocated at the rate of from 50 to several hundred strokes per minute, according to the capacity of the motor and the weight of the parts to be manipulated. Upon the first upward stroke of a parachute, it will be lifted without displacing the air above it, as the air will flow freely through the valves of the parachute. On the first downward stroke, the valves of the parachute will close, and the inertia of the air beneath the parachute will be such that the parachute will remain substantially stationary, and the motor will therefore tend to elevate the body and the other parachute. When the second parachute is elevated, it will pass freely through the air and then rest thereon, causing another upward movement of the body. These actions are repeated many times during a minute, and I assume that the machine will be rapidly elevated. When a suitable altitude has been attained and it is desired to move forward, the parachutes will be slightly inclied or tilted by means of the cords provided for the purpose, after which the operation of the parachutes will tend to expel air from one end of the machine, and the resistance to said movement of the air causes the forward movement of the machine as a whole. The motor may be stopped at any time when the machine is at a suitable elevation, and the machine will either drop slowly to the ground or will soar in the air and toward the earth, depending upon the positions of the parachutes. The machine may be stopped at moment of alighting. The steering is accomplished by shifting the weight laterally in the car, as by the movement of the person therein, or rudders may be added in front of the car or at its side or back.

As various modifications of my invention will readily suggest themselves to one skilled in the art I do not confine the invention to the specific structure herein shown and described.

Having thus described my invention, I claim as new and desire to secure by Letters Patent:

1. A flying machine comprising a body part or car in combination with the motor in said car, two or more parachutes arranged one above the other above said car, stems or frames connecting said parachutes with said motor, for operation thereby, said parachutes being longitudinally elongated and transversely curved, and means for independently inclining said parachutes, substantially as described.

2. In a flying machine, a car in combination with the motor in said car, vertically reciprocatable frames suitably guided in the car structure, reciprocating means operatively interposed between said frames for reciprocating said frames in opposite directions, longitudinally elongated and transversely curved parachutes arranged one above the other and connected with the respective frames and means for independently inclining said parachutes with respect to their frames, substantially as described.

3. A flying machine comprising a car in combination with reciprocating frames vertically disposed and slidable in the structure of said car, a motor secured to the car structure and connected with said frames to reciprocate the same in opposite directions, longitudinally straight, transversely curved parachutes wherefrom the respective frames are suspended, gates or flanges in the ends of said parachutes and means for inclining said parachutes with respect to their frames and for opening and closing said gates, substantially as described.

4. A flying machine comprising a car in combination with reciprocating frames vertically disposed and slidable in the structure of said car, a motor secured to the car structure and connected with said frames to reciprocate the same in opposite directions, longitudinally straight, transversely curved parachutes wherefrom the respective frames are suspended, gates or flanges in the ends of said parachutes and automatic means for opening said gates as the parachutes are inclined and closing the same as the parachutes are restored to perpendicular relation to said frames.

5. A flying machine comprising the car in combination with vertically reciprocative frames, a motor fixed in said car, reciprocating means connecting said motor with said frames, parachutes connected with the respective frames, gates or flanges provided in the ends of said parachutes and means for opening and closing said gates, substantially as described.

6. A flying machine comprising a car in combination with vertically reciprocating frames, a motor in the car, reciprocating means connecting motor and frames, parachutes arranged one above the other and connected with said frames, said parachutes being longitudinally straight and transversely curved, flanges in the ends thereof and the sustaining surfaces or diaphragms of said parachutes being composed of a plurality of flexible vertically movable valves adapted to open on upward movement and to close on downward movement of the parachutes, substantially as described.

7. In a flying machine, a plurality of longitudinally straight, transversely curved parachutes having their sustaining surfaces or diaphragms composed of many upwardly closing and downwardly opening valves, and end gates in said parachutes, substantially as described.

8. In a flying machine a parachute comprising a longitudinally straight and transversely curved frame in combination with valves provided in the ends of said frame and a plurality of downwardly opening and upwardly closing valves attached to said frame, conformed thereto and constituting the sustaining surface of the parachute, substantially as described.

9. A flying machine comprising a car in combination with vertically reciprocating frames guided in said car, a motor in said car, vertical chains driven by said motor, connecting rods joining the same to the respective frames, parachutes arranged one above the other and connected with the respective frames, means for inclining said parachutes with relation to said car, valves in the ends of said parachutes and means for operating the same, substantially as described.

10. A flying machine comprising a car in combination with vertically reciprocating frames guided in said car, a motor in said car, vertical chains driven by said motor, connecting rods joining the same to the respective frames, parachutes arranged one above the other and connected with the respective frames, means for inclining said parachutes with relation to said car, valves in the ends of said parachutes, each said parachute having a foraminous top and many downwardly opening and upwardly closing valves adapted to close against said top, substantially as described.

11. A flying machine comprising a car in combination with a motor in said car, frames vertically slidable in said car, reciprocating connections interposed between said frames and said motor, parachutes pivotally attached to the upper ends of frames at points below the bottoms of said parachutes valves secured in the ends of said parachutes, means for operating said valves and means for tilting said parachutes, substantially as described.

12. A flying machine comprising a pair of longitudinally elongated, transversely curved, substantially rectangular parachute frames one above the other arranged for reciprocation, in combination with a plurality of downwardly opening and upwardly closing valves constituting the sustaining surface of the parachute and means for controlling the escape of air laterally from beneath the parachute, substantially as described.

13. A flying machine comprising a pair of longitudinally elongated, transversely curved, substantially rectangular parachute frames, one above the other arranged for reciprocation in combination with a plurality of downwardly opening and upwardly closing valves constituting the sustaining surface of the parachute, means preventing the escape of air laterally beneath the parachute and means governing the longitudinal movement of air beneath the parachute, substantially as described.

14. A flying machine comprising a car in combination with a pair of frames, arranged for vertical reciprocation, means for supporting said frames in vertical position from said car, a pair of vertically movable chains arranged in said car, rods connecting the said reciprocative frames to the said vertically movable chains, means on said car for driving said chains, parachutes secured to the ends of the respective frames, said parachutes comprising a longitudinally straight transversely curved frame covered with netting, valves arranged in the ends of said parachutes, means operable from the car body for tilting said parachutes, substantially as described.

In testimony whereof, I have hereunto set my hand, this 4th day of December, 1908, in the presence of two subscribing witnesses.

GEORGE E. DICKSON.

Witnesses:
CHARLES GILBERT HAWLEY,
M. SIMON.